Sept. 24, 1957  H. HENNIG ET AL  2,807,649
PROCESS FOR THE MANUFACTURE OF METHYL MERCAPTAN
FROM METHANOL AND HYDROGEN SULFIDE
Filed Dec. 18, 1953
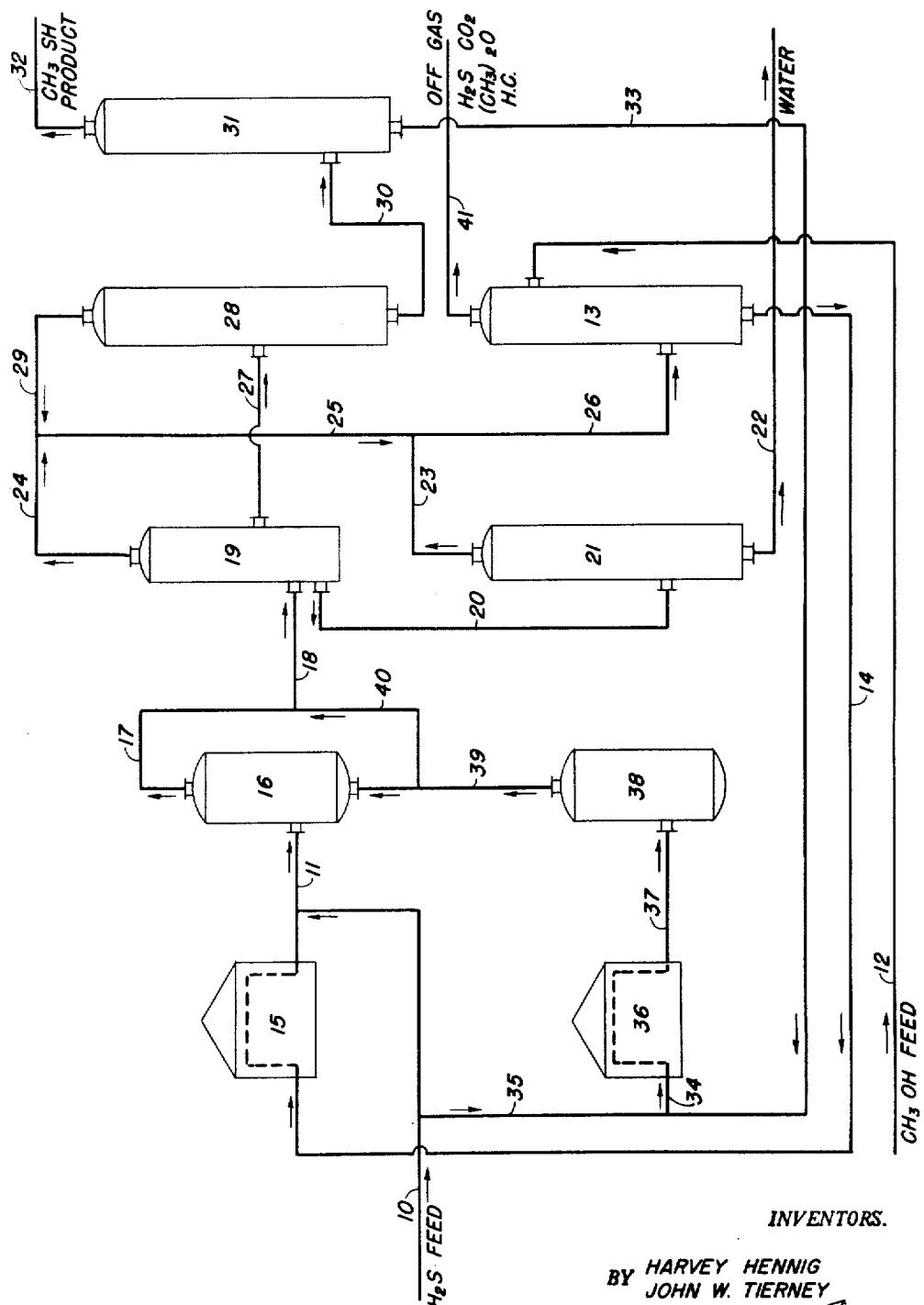
INVENTORS.
BY HARVEY HENNIG
JOHN W. TIERNEY
ATTORNEY.

United States Patent Office 2,807,649
Patented Sept. 24, 1957

---

2,807,649

PROCESS FOR THE MANUFACTURE OF METHYL MERCAPTAN FROM METHANOL AND HYDROGEN SULFIDE

Harvey Hennig, Cary, and John W. Tierney, Huntley, Ill., assignors to The Pure Oil Company, Chicago, Ill., a corporation of Ohio Application December 18, 1953, Serial No. 399,066

5 Claims. (Cl. 260—609)

This invention relates to the preparation of methanethiol and is more specifically concerned with an integrated process for the manufacture of methanethiol by reacting separate amount of hydrogen sulfide with separate proportions of methanol and 2-thiapropane, respectively.

Numerous methods for the production of mercaptans employing a plurality of different reactants and different reaction mechanisms are described in the prior art. In spite of this variety, there has only been one process which has any commercial significance, namely, the reaction between olefins and hydrogen sulfide carried out in the presence of a suitable catalyst such as silica-alumina, Friedel-Crafts catalyst and the like. While this process produces excellent results when employed in the production of high molecular weight mercaptans, it can not be used to produce in commercial quantities the lowest molecular weight member of the homologous mercaptan series, namely, methanethiol. Heretofore there was no considerable demand for methanethiol because only limited amounts were necessary to supply the demand for its use as an odorant to be added to odorless gases, such as natural gas, in order to facilitate the detection of leaks or as an intermediate in chemical reactions. With the discovery that methionine, an amino acid having the formula $$CH_3.CH_2.CH_2.CHNH_2COOH$$

was important in animal nutrition and could overcome dietary deficiencies when used as a supplement in poultry feed, development work on the production of commercial amounts of methanethiol was accelerated because of the importance of methanethiol as an intermediate in the production of methionine. Of the several processes available for the preparation of methanethiol, the petroleum industry as producers of this compound would be most interested in the one involving the reaction between methanol and hydrogen sulfide because of the availability of the reactants from within the industry itself or its allied industries. Hydrogen sulfide is available in the tail gas of numerous petroleum refining processes and can be readily purified to remove small amounts of contaminants, such as $CO_2$ and light hydrocarbons by conventional gas purification processes. Methanol can be obtained as a product of the methanol synthesis process, wherein a synthesis gas consisting essentially of hydrogen and carbon monoxide obtainable by the oxidation of natural gas, is contacted with a suitable catalyst to form methanol and minor amounts of other oxygenated organic compounds. Thus the use of this basic reaction for producing methanethiol permits it to be economically produced, inasmuch as the reactants may be readily obtained and unusual operating conditions of temperature and pressure and the like which would require special processing equipment are not necessary.

In previous preparations of methanethiol by the reaction between methanol and hydrogen sulfide, thoria was employed as a catalyst. Because of high cost of thoria, its density, tendency to pack, heat sensitivity and low mechanical strength, considerable effort has been expended in investigating other catalysts which would not have the inherent defects of thoria and which could be more effectively used in promoting the reactions. As a result, a number of satisfactory catalysts have been discovered which possess the required physical characteristics. Some of these, however, while possessing the physical desiderata are deficient from a chemical standpoint because of poor selectivity. In other words, these catalysts not only increase the efficiency of the primary reaction, but also effect the production of substantial amounts of side products. The side reactions which produce these secondary products result in the production of considerable quantities of 2-thiapropane, some dimethyl ether, as well as insignificant amounts of formaldehyde. These side products, of course, seriously affect the yield of methanethiol as determined by the amount of methanol which is used in the process.

It is therefore an object of this invention to increase the ultimate yield of methanethiol produced in the reaction between methanol and hydrogen sulfide by converting the 2-thiapropane produced as a by-product into methanethiol.

One advantageous system utilizing the principle of this invention is illustrated schematically in Figure 1 of the attached drawing.

According to the process of the invention, the ultimate yield of mercaptan may be produced by reacting in a primary reactor hydrogen sulfide and methanol in the presence of a suitable catalyst under suitable reaction conditions to produce a reaction effluent which contains, in addition to the methanethiol, substantial amounts of 2-thiapropane. The effluent is processed in a recovery system to recover therefrom separate streams of methanethiol and 2-thiapropane. The latter by-product of the reaction is recycled to a secondary reaction reactor wherein it is interreacted with additional amounts of hydrogen sulfide and in the presence of a second catalyst different from that employed in the primary reaction zone and converted into methanethiol.

For a more specific description of this invention, reference is made to Figure 1 where it is seen that fresh hydrogen sulfide feed passes through line 10 and into line 11. Methanol is charged to the system by means of line 12. It is initially sent to absorber 13, the purpose of which is hereinafter discussed. The methanol feed is discharged from absorber 13, through line 14. It is then heated to reaction temperature in furnace 15, and passed through line 11 where it commingles with the hydrogen sulfide feed to form the reaction mixture. The reaction mixture of methanol and hydrogen sulfide is introduced into primary reactor 16, which may be of the fixed bed or fluidized type. The catalyst used herein is one suitable for promoting the reaction between hydrogen sulfide and methanol to produce methanethiol. The effluent from reactor 16 goes through lines 17 and 18 into separator 19 where, upon cooling, three phases are formed, a gas phase, a methanethiol phase, and a water phase, all in equilibrium with each other. The water phase, containing some hydrogen sulfide and methyl mercaptan and most of the unreacted methanol in solution, goes through line 20 to a fractionator 21 where the water is taken off as the bottom product through line 22. The gaseous overhead from fractionator 21, consisting essentially of hydrogen sulfide, methanethiol, and minor amounts of 2-thiapropane, and methanol, passes through line 23 to a point of confluence with the gaseous phase from separator 19. This gaseous phase which is discharged from separator 19 through lines 24 and 25 has a composition similar to the gaseous overhead from fractionator 21. The resultant admixture which is produced in line 26 is charged into absorber 13. In absorber 13 the gaseous feed is contacted with the fresh feed methanol entering via line 12. The methanol absorbs methanethiol, 2-thiapropane, methanol, and substantial amounts of the hydrogen sulfide from the gases. The enriched methanol thus prepared is used in the preparation of the reaction mixture as hereinbefore described. The overhead effluent from absorber 13, consisting essentially of hydrogen sulfide admixed with small amounts of materials as $CO_2$ and light hydrocarbons which may be present in the hydrogen sulfide fresh feed, and dimethyl ether which may be produced in reactor 16 in small amounts, then is passed to flare for disposal through line 41. In the alternative this stream may be processed to effect the recovery of substantially pure hydrogen sulfide which could be recycled for reuse in the reaction section of the system.

The methanethiol phase, containing most of the 2-thiapropane, some dimethyl ether, hydrogen sulfide, unreacted methanol, and a trace of water, passes through line 27 into stabilizer 28 where all material with a boiling point lower than methanethiol goes through lines 29 and 25 to join the other gases in line 26. The bottom product from the stabilizer 28, consisting essentially of methanethiol, 2-thiapropane, methanol, and some water, are carried through line 30 into fractionator 31. The methyl mercaptan product is taken off overhead through line 32 and goes to suitable storage facilities. The bottoms from fractionator 31, consisting essentially of 2-thiapropane, some methanol, and a trace of water, is sent through line 33, and admixed in line 34 with fresh hydrogen sulfide which has been transferred from the main hydrogen sulfide feed line 10 by means of line 35. This feed to the secondary reaction is heated in heater 36. The heated composite flows through line 37 into secondary reactor 38. Like reactor 16, 38 may be of the fixed or fluidized bed type. However, a different catalyst than the catalyst used in the primary reactor is employed for promoting the reaction between 2-thiapropane and hydrogen sulfide to produce methanethiol. The reaction effluent from reactor 38 consists of methanethiol, traces of water, and unreacted 2-thiapropane, hydrogen sulfide, and methanol. This reaction effluent from reactor 38 carries through lines 39 and 40 to join the effluent from primary reactor 16. Both streams are jointly processed in the recovery system described above. In the event that it is desirable to pass the effluent from the secondary reactor 38 into the primary reactor 16 directly in order to react the unreacted hydrogen sulfide from reactor 38 with methanol in reactor 16, line 37 may be installed along with suitable flow control devices which will permit the reaction effluent from reactor 38 to be sent directly to reactor 16.

An example of the benefits obtainable by the practice of the process here disclosed is given in column 1, Table I. The results are compared with the yields obtained when employing an alumina catalyst of lower selectivity than the thoria catalyst, without conversion of the 2-thiapropane formed (column 2), and when employing a thoria-on pumice catalyst (column 3). The product yield is the same for each case, and hence the size of recovery system required is comparable. With the process of this invention results are achieved with an inexpensive catalyst of lower selectivity as with a relatively expensive catalyst such as thoria, and notable economics are accomplished.

The overall feed requirements and yields are:

| Case | I | | | II | III |
|---|---|---|---|---|---|
| | A [1] | B | Total | | |
| Catalyst, Reactor #1 | Alumina | | | Alumina | Thoria-on-Pumice |
| Catalyst, Reactor #2 | | Silica-Alumina | | | |
| Reactor Temp., °F | 750 | 1,000 | | 750 | 750 |
| Reactor Press., p. s. i. g | 150 | 150 | | 150 | 100 |
| Reactor Space Velocity, V./hr./V.: | | | | | |
| (on $CH_3OH$) | 0.4 | | | 0.4 | 0.5 |
| (on $(CH_3)_2S$) | | 0.25 | | | |
| $CH_3OH$, Fresh Feed, lb./hr | 393 | | 393 | 600 | 458 |
| $H_2S$, Fresh Feed, lb./hr. (85% Pure) | 96 | 573 | 669 | 774 | 689 |
| $(CH_3)_2S$ Feed, lb./hr. (89% Pure) | | [3] 331 | | | |
| | | | 1,062 | 1,374 | 1,147 |
| Reactor Charge, Moles/hr | 45.5 | 21.3 | | 49.1 | 45.8 |
| $CH_3SH$ Product, lb./hr | | | 500 | 500 | 500 |
| Off gas, lb./hr | | | 333 | 354 | 339 |
| Water to sewer, lb./hr | | | 229 | 328 | 188 |
| Liquid by-products, lb./hr [2] | | | | 192 | 120 |
| | | | 1,062 | 1,374 | 1,147 |

[1] Effluent from reactor #2 passes into reactor #1.
[2] Mixture of $(CH_3)_2S$, $CH_3OH$ and $H_2O$.
[3] Internal cycle stream.

The foregoing examples of the instant process and the operating conditions employed therein are only illustrative, non-limiting examples of the instant invention. In carrying out the primary reaction between methanol and hydrogen sulfide, a range of operating conditions may be employed. The reaction temperature may be from about 650° F. to 850° F. and although operation at a superatmospheric pressure of from about 20 to 150 p. s. i. g. is preferred, the process may be operated at lower pressures including atmospheric and subatmospheric pressures. The space velocity, LHSV, which is defined as the liquid volume at 60° F. of the limiting reactant fed per hour per unit volume of effective reactor or catalyst bed may be from about 0.25 to 5.0 v./hr./v. In the first reaction zone the limiting reactant which is used to determine space velocity is methanol. The mol ratio of the reactants may range from about 1 to about 5 mols of hydrogen sulfide to 1 mol of methanol. Although it is generally preferred to maintain an excess of hydrogen sulfide in the reactant mixture, it may be desirable to employ substantially stoichiometric proportions in order to avoid unnecessary complications that may occur, for example, in the recovery system. Catalysts of low selectivity which may be used for promoting the reaction between methanol and hydrogen sulfide to produce methanethiol in the first reaction zone include activated alumina, bauxite, and oxides of the metals in groups IV–A and VI–A of the periodic arrangement of elements compiled and published by the W. M. Welch Manufacturing Co.

Similarly in the secondary reaction zone employed in the process of this invention a variety of operating conditions may be employed. For example, a temperature range of about 700–1200° F. and preferably from about 900–1150° F.; pressure from about 0–150 p. s. i. g. with a preferred range of about 20 to 150 p. s. i. g.; LHSV range of about 0.1 to 10, preferred 0.2 to 2, and a molar ratio of hydrogen sulfide to 2-thiapropane of from 1:1 to 10:1 with a preferred range of 2:1 to 7:1, are typical of the variations in operating conditions that may be employed in the secondary reaction zone. In the instant invention the catalyst employed in the second reaction zone is different from that employed in the first reaction zone and is a catalyst which is suitable for promoting the reaction between 2-thiapropane and hydrogen sulfide. Suitable catalysts which may be used in this phase of the subject process include synthetic silica-alumina or natural silica-alumina clays, activated by suitable treatment, silica gel; silica-alumina being the preferred catalyst.

The common product recovery system described in the foregoing example is a feature of this invention. In this illustrative system the principles of fractional condensation and stabilization are employed. However, it is within the scope of the instant invention to employ alternative process recovery techniques, for example those in which the principles of absorption are utilized. Suitable recovery systems employing both principles are further described in a copending patent application, Serial Number 260,353, filed by Richmond T. Bell on December 7, 1951. Other types of recovering systems may also be used, it only being necessary for carrying out the instant invention that an efficient recovery system for separating methanethiol and 2-thiapropane from the reaction effluents be employed.

Having described our invention we now claim:

1. A process for preparing methanethiol which comprises interacting in a primary reactor, methanol and hydrogen sulfide at reaction conditions at a temperature of about 650° F. to 850° F., a pressure of about 20 p. s. i. to 150 p. s. i. and a mol ratio of 1–5 mols of hydrogen sulfide per mol of methanol in the presence of a catalyst consisting essentially of activated alumina, to produce a reaction effluent containing substantial amounts of methanethiol and 2-thiapropane, recovering from the reaction effluent a methanethiol fraction and a 2-thiapropane fraction, passing the 2-thiapropane fraction to a secondary reactor, reacting the 2-thiapropane fraction with hydrogen sulfide in the absence of methanol at reaction conditions at a temperature of about 900° F. to 1150° F., a pressure of about 20 p. s. i. to 150 p. s. i. and a mol ratio of about 1–5 mols of hydrogen sulfide per mol of methanol in the presence of a catalyst consisting essentially of synthetic and natural silica-alumina to produce additional quantities of methanethiol.

2. A process for preparing methanethiol which comprises interacting in a primary reactor, methanol and hydrogen sulfide at a temperature of about 650° F. to 850° F and a pressure of about 20 p. s. i. to 150 p. s. i. employing a liquid volume hourly space velocity, based on methanol, of about 0.25–5.0 and a mol ratio of about 1–5 mols of hydrogen sulfide per mol of methanol in the presence of activated alumina to produce a reaction effluent containing substantial amounts of methanethiol and 2-thiapropane, recovering from the reaction effluent a methanethiol fraction, and a 2-thiapropane fraction, passing the 2-thiapropane fraction to a secondary reactor, reacting the 2-thiapropane fraction with hydrogen sulfide in the absence of methanol at reaction conditions at a temperature of about 900° F. to 1150° F. and a pressure of about 20 p. s. i. to 150 p. s. i. employing a liquid volume hourly space velocity, based on 2-thiapropane, of about 0.2–2 and a mol ratio of about 2–7 mols of hydrogen sulfide per mol of 2-thiapropane in the presence of silica-alumina to produce additional quantities of methanethiol.

3. A process in accordance with claim 2 in the reaction effluent containing substantial amounts of hydrogen sulfide is passed directly to the primary reactor whereby said hydrogen sulfide interacts with said methanol.

4. A process for preparing methanethiol which comprises interacting methanol and substantially stoichiometric amounts of hydrogen sulfide in a primary reactor at a temperature of 750° F. and a pressure of 150 p. s. i., employing a liquid volume hourly space velocity, based on methanol, of about 0.4 in the presence of an activated alumina catalyst to produce a reaction effluent containing substantial amounts of methanethiol and 2-thiapropane, water, dimethyl ether, unreacted methanol and hydrogen sulfide, fractionating said effluent to produce a methanethiol fraction and a 2-thiapropane fraction, introducing the 2-thiapropane fraction and hydrogen sulfide into a secondary reactor and reacting said thiapropane and hydrogen sulfide in the absence of methanol at a temperature of 1000° F. and a pressure of 150° F., employing a liquid volume hourly space velocity, based on 2-thiapropane, of about 0.25 and a mol ratio of about 3 mols of hydrogen sulfide per mol of 2-thiapropane in the presence of a silica-alumina catalyst to produce a secondary reactor reaction effluent containing substantial amounts of methanethiol, and unreacted 2-thiapropane and hydrogen sulfide passing the secondary reactor reaction effluent directly into said primary reactor.

5. A process in accordance with claim 4 in which the hydrogen sulfide employed in producing methanethiol in the primary reactor is supplied entirely from said secondary reactor reaction effluent.

References Cited in the file of this patent
UNITED STATES PATENTS

| | | |
|---|---|---|
| 2,116,182 | Baur | May 3, 1938 |
| 2,514,300 | Laughlin | July 3, 1950 |
| 2,565,195 | Bell | Aug. 21, 1951 |
| 2,647,151 | Bell | July 28, 1953 |
| 2,667,515 | Beach et al. | Jan. 26, 1954 |
| 2,685,605 | Bell | Aug. 3, 1954 |

OTHER REFERENCES

Schulze et al.: Ind. & Eng. Chem., vol. 40, No. 12, pages 2308–11 (Dec. 1948).

UNITED STATES PATENT OFFICE

CERTIFICATE OF CORRECTION

Patent No. 2,807,649

September 24, 1957

Harvey Hennig et al.

It is hereby certified that error appears in the printed specification of the above numbered patent requiring correction and that the said Letters Patent should read as corrected below.

Column 5, line 50, for "1-5 mols" read -- 2-7 mols --; line 51, for "methanol" read -- 2-thiapropane --.

Signed and sealed this 7th day of January 1958.

(SEAL)
Attest:

KARL H. AXLINE
Attesting Officer

ROBERT C. WATSON
Commissioner of Patents